US009104731B2

(12) United States Patent
Johnson et al.

(10) Patent No.: US 9,104,731 B2
(45) Date of Patent: Aug. 11, 2015

(54) RELOCATED JOINS IN A DISTRIBUTED QUERY PROCESSING SYSTEM

(75) Inventors: Curtis Johnson, Bow, NH (US); Steve Olson, Sanbornton, NH (US); Victor Mesenzeff, Dunbarton, NH (US); Sudipto Chowdhuri, San Ramon, NH (US)

(73) Assignee: SYBASE, INC., Dublin, CA (US)

( * ) Notice: Subject to any disclaimer, the term of this patent is extended or adjusted under 35 U.S.C. 154(b) by 883 days.

(21) Appl. No.: 12/170,887

(22) Filed: Jul. 10, 2008

(65) Prior Publication Data

US 2010/0010976 A1    Jan. 14, 2010

(51) Int. Cl.
*G06F 17/30* (2006.01)

(52) U.S. Cl.
CPC .............................. *G06F 17/30498* (2013.01)

(58) Field of Classification Search
None
See application file for complete search history.

(56) References Cited

U.S. PATENT DOCUMENTS

| 5,903,893 A * | 5/1999 | Kleewein et al. ............. 707/714 |
| 2003/0101195 A1 * | 5/2003 | Linhart ........................ 707/102 |
| 2004/0181537 A1 * | 9/2004 | Chawla et al. ................ 707/100 |

OTHER PUBLICATIONS

P. Larson, J. Goldstein, and J. Zhou. MTCache: Transparent Mid-Tier Database Caching in Sql Server, in ICDE, 2004.*

* cited by examiner

*Primary Examiner* — Jay Morrison
(74) *Attorney, Agent, or Firm* — Sterne Kessler Goldstein & Fox P.L.L.C.

(57) ABSTRACT

A system, method, and computer program product are provided for performing a join operation between a local table at a local server and a remote table at a remote server. In accordance with an embodiment of the present invention, a query instruction to join the local table and the remote table is received at the remote server. Qualifying rows of the local table are then retrieved to the remote server, and the remote table is joined with the qualifying rows to generate a result table, which is then sent to the local server.

19 Claims, 6 Drawing Sheets

FIG. 1

LOCAL SERVER 106

LTABLE 202

| A | B |
|---|---|
| 1 | RED |
| 5 | GREEN |
| 27 | RED |
| 98 | BLUE |
| 110 | BLUE |
| 135 | BLUE |

REMOTE SERVER 110

RTABLE 204

| A | B |
|---|---|
| 4 | JAPAN |
| 5 | UK |
| 25 | USA |
| 27 | USA |
| 100 | UK |
| 110 | USA |
| 135 | JAPAN |

RELOCATED JOINS IN A DISTRIBUTED QUERY PROCESSING SYSTEM

BACKGROUND OF INVENTION

1. Field of the Invention

The present invention relates generally to databases and, more specifically, to performing join operations on a distributed system.

2. Description of the Background Art

As distributed query processing systems, such as distributed databases, are used in complex network environments, it becomes necessary to carefully account for the amount of data shifted between individual processing modules in the distributed system. Large queries sent over a busy network can result in millions of rows of data being returned over a potentially saturated network connection, slowing down processing of the query.

In a distributed query processing system where a first processing module and a second processing module within the system each have a set of tables of a database, it is often optimal to maintain only a local set of tables at each processing module location. For example, first processing module may have access to tables A, B, and C, and second processing module might have access to tables D, E, and F, but neither has copies of the other's tables. This is typically done due to the cost of synchronizing updates to tables shared between the first processing module and the second processing module.

However, for an operation to retrieve data from two or more tables, where at least two of the tables are located at separate processing modules from each other, it is necessary to somehow retrieve the data from either one or both of the modules to a central location in order to perform the operation. A join operation, which requires the combination of data from two or more tables, is such an operation.

Previous approaches to this problem, as regarding join operations, include the use of a merge join. In a merge join, qualifying rows (i.e., only those rows needed for the join operation) are retrieved from a remote server to a local server, and the join operation performed at the local server. While this is acceptable if there are few qualifying rows, it becomes an expensive operation the larger the number of rows retrieved from the remote server. Other approaches involve the use of nested loops to obtain data from remote tables, where each iteration of the loop requires a scan of the remote table. This approach suffers due to the cost of starting scan operations over a network.

Accordingly, what is desired is a means for improving a join operation where retrieving data rows from a remote server is expensive.

SUMMARY OF INVENTION

Embodiments of the invention include a method for performing a join operation between a local table at a local server and a remote table at a remote server. The method includes the steps of receiving a query at the remote server, wherein the query is an instruction to join the local table and the remote table, retrieving qualifying rows of the local table, joining the remote table with the qualifying rows to generate a result table, and sending the result table to the local server.

Additional embodiments of the invention include a system for performing a join operation between a local table at a local server and a remote table at a remote server. The system includes a first receiving module for receiving a query at the remote server, wherein the query is an instruction to join the local table and the remote table, a retrieving module for retrieving qualifying rows of the local table, a joining module for joining the remote table with the qualifying rows to generate a result table, and a first sending module for sending the result table to the local server.

Further embodiments of the invention include a computer program product comprising a computer-usable medium having computer program logic recorded thereon for enabling a processor to perform a join operation between a local table at a local server and a remote table at a remote server. The computer program logic includes first receiving means for enabling a processor to receive a query at the remote server, wherein the query is an instruction to join the local table and the remote table, retrieving means for enabling a processor to retrieve qualifying rows of the local table, joining means for enabling a processor to join the remote table with the qualifying rows to generate a result table, and first sending means for enabling a processor to send the result table to the local server.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the relevant art to make and use the invention.

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

I. Introduction

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

It would be apparent to one of skill in the art that the present invention, as described below, can be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, given the level of detail presented herein.

Figure 1:
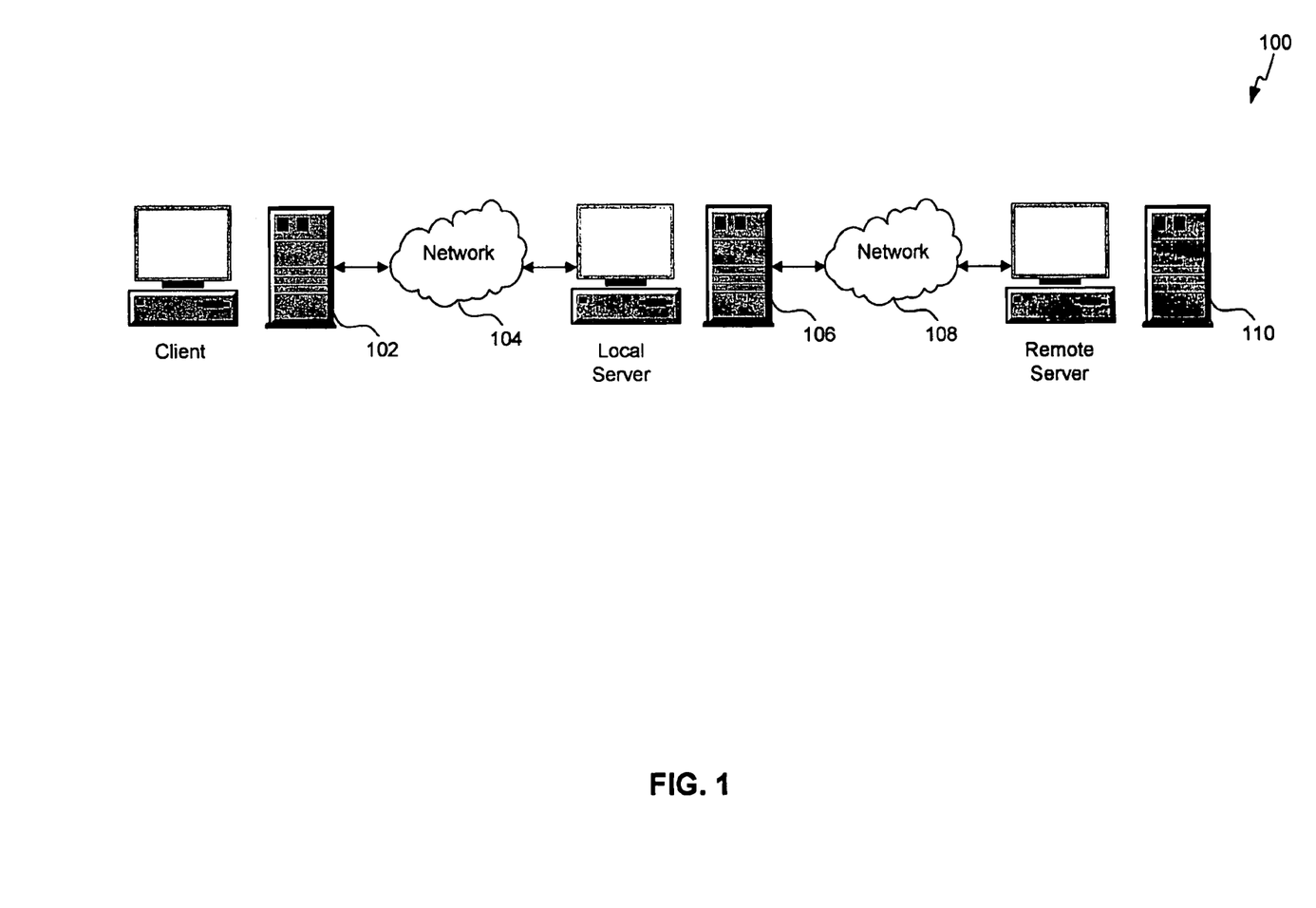
FIG. 1 illustrates an example network on which embodiments of the present invention may be implemented.

FIG. 1 is a network 100 in which the present invention, or portions thereof, can be implemented. A client 102 is able to communicate over network 104 with local server 106, in accordance with an embodiment of the present invention. In accordance with an additional embodiment of the present invention, local server 106 is able to communicate over network 108 with remote server 110. In accordance with a further embodiment of the present invention, local server 106 and remote server 110 are database servers. The database servers of local server 106 and remote server 110 are, in an embodiment, instances of Sybase Adaptive Server Enterprise software developed by Sybase, Inc. of Dublin, Calif.

One skilled in the relevant art will appreciate that networks 104 and 108 may refer to the same network or multiple networks. Additionally, one skilled in the relevant art will further appreciate that client 102, local server 106, and remote server 110 may be executed on any combination of one or more physical machines. For example, in an embodiment, client 102 and local server 106 are located within a single physical machine, and the network 104 that enables communications between client 102 and local server 106 consists solely of the single physical machine in communication with itself. Moreover, one skilled in the relevant art will recognize that client 102, local server 106, and remote server 110 may be implemented as components of a single program. The aforementioned configurations of network 100 are provided by way of example, not limitation, to show that network 100 is configurable in a number of ways while allowing for an implementation of the present invention, or portions thereof, thereupon.

Figure 2:
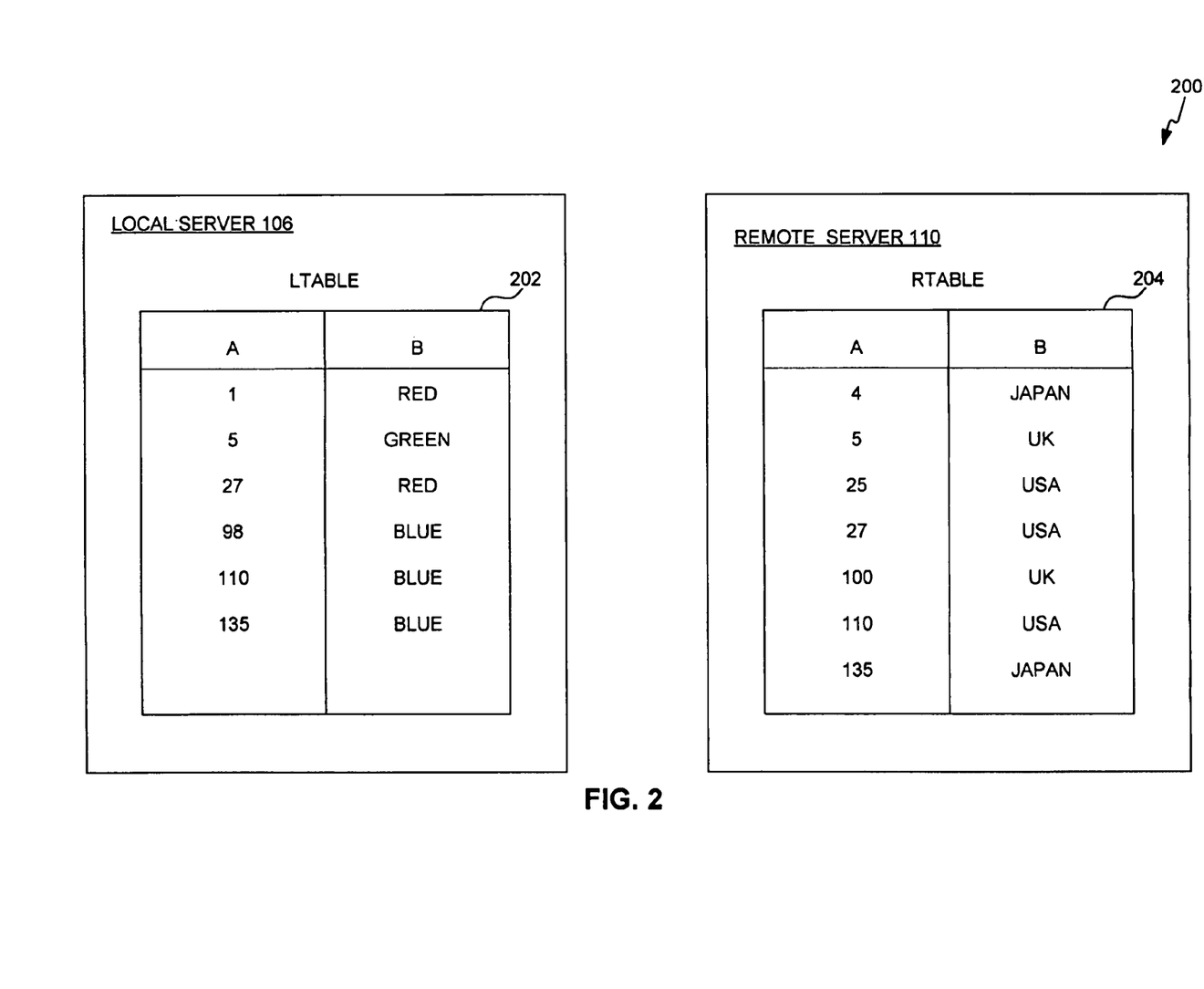
FIG. 2 illustrates tables located in a local server and a remote server, in accordance with an embodiment of the present invention.

FIG. 2 is a database 200 with constituent tables located at local server 106 and remote server 110, in accordance with an embodiment of the present invention. Local table (or "LTABLE") 202 is located at the local server 106. Remote table (or "RTABLE") 204 is located at the remote server. LTABLE 202 and RTABLE 204 are shown in FIG. 2 populated with a number of row values for each of their respective data fields "A" and "B." Further reference to a particular column within a table in this document is denoted by the convention <tablename>.<columnname>, such that column "B" of the LTABLE 202 table is referred to as "LTABLE.B."

A "join" operation in a database system is an operation that combines data from columns of a first table with columns from a second table. So, for example, a query of the form:

select LTABLE.A, LTABLE.B, RTABLE.B from LTABLE, RTABLE
where LTABLE.A = RTABLE.A and RTABLE.A = 110;

would return a table having three columns, the columns corresponding to columns A and B of the LTABLE 202 table and column B of the RTABLE.B 204 table, these columns having been "joined" to produce the return table. The rows from LTABLE 202 and RTABLE 204 used to populate the return table are those where the values of column A of the LTABLE 202 table and column A of the RTABLE 204 table match, and further where the value of column A at RTABLE 204 is "110." In the example tables of FIG. 2, the values of column A from LTABLE 202 at rows 2, 3, 5, and 6 match the values of column A from RTABLE 204 at rows 2, 4, 6, and 7, respectively. However, only row 5 of LTABLE 202 matches the second condition, having a value of 110 for LTABLE.A. The returned row using the above query, again based on the example of FIG. 2, would be:

| 110 | BLUE | USA |
|---|---|---|

If tables LTABLE 202 and RTABLE 204 are located in separate physical machines, such as local server 106 and remote server 110 separated by a network 108, performing the aforementioned join operation using prior art techniques compounds any latency associated with network 108. These prior art techniques are discussed more thoroughly in the Description of the Background Art section, supra. Instead, in some situations it is beneficial to perform a relocated join instead of using one of the aforementioned prior art techniques. The relocated join process is discussed in detail in Section II.

The use of a single local table, LTABLE, and a single remote table, RTABLE, is by way of example, and not limitation. One skilled in the relevant art will appreciate that the aforementioned join operation may be extended to include multiple local tables and/or multiple remote tables in a single statement.

II. Performing a Relocated Join

Figure 3:
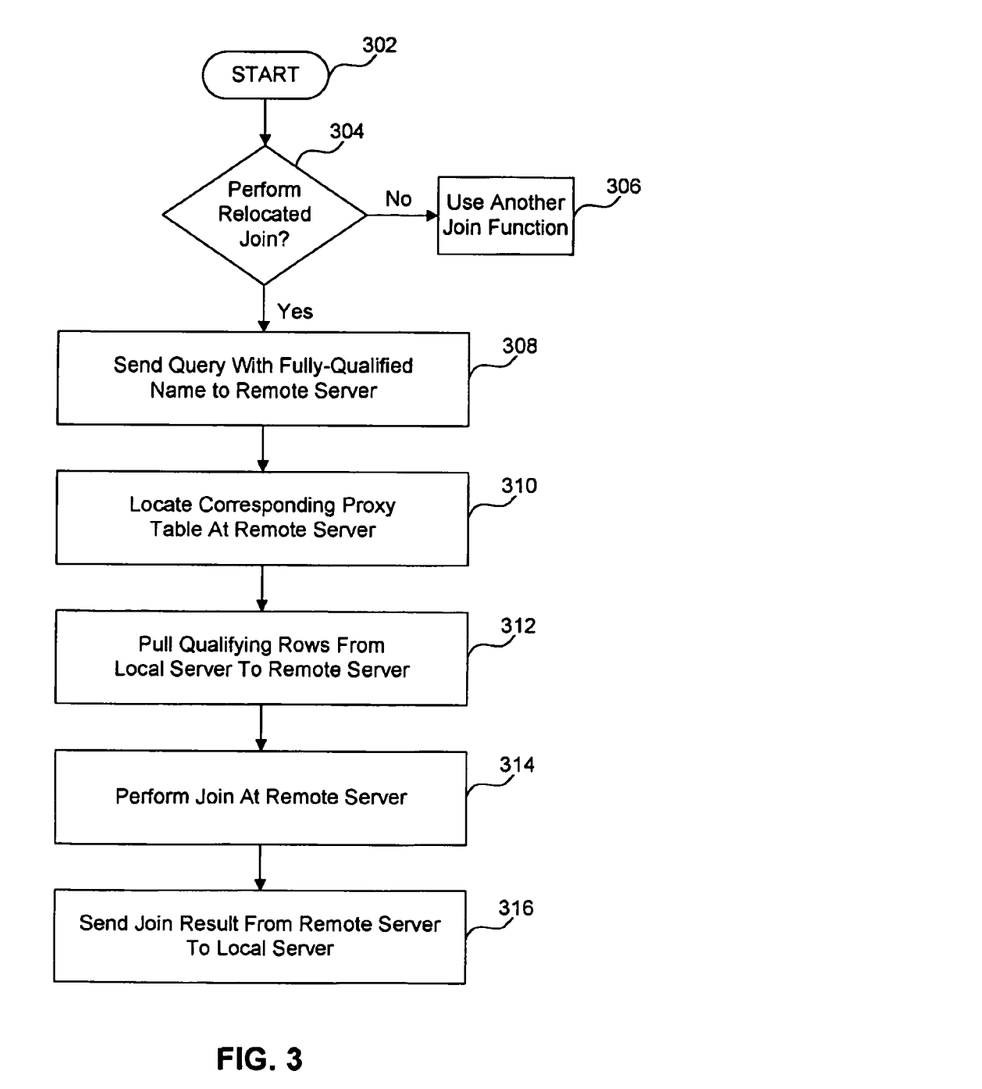
FIG. 3 is a flowchart illustrating steps by which a relocated join is performed, in accordance with an embodiment of the present invention.

FIG. 3 is a flowchart 300 illustrating steps by which a relocated join is performed. The method starts at step 302 and proceeds to step 304 where an optimizer determines whether to perform a relocated join. The functionality of the optimizer is discussed further in Section III, below. If the optimizer determines at step 304 that it would not be beneficial to perform a relocated join, then another join function is selected and used at step 306.

At step 308, a query with a fully-qualified name for a table in a local server, such as local server 106, is sent to the remote server, such as remote server 110, in accordance with an embodiment of the present invention. For example, a query of the form:

select LTABLE.A, LTABLE.B, RTABLE.B from LTABLE, RTABLE
where LTABLE.A = RTABLE.A and RTABLE.A = 110 and
LTABLE.B = "BLUE";

where LTABLE and RTABLE are located at the local server 106 and the remote server 110, respectively, would be sent to the remote server as:

select LTABLE.A, LTABLE.B, RTABLE.B from
localserver.mydb.dbo.LTABLE, RTABLE where LTABLE.A =
RTABLE.A and RTABLE.A = 110 and LTABLE.B = "BLUE";

In the above example, the fully-qualified four-part table name "localserver.mydb.dbo.LTABLE" instructs the remote server 110 on where the table LTABLE 202 is located. One skilled in the relevant art will appreciate that other means for identifying the location of a table on another system may be used, and the aforementioned query is shown by way of example, and not limitation.

At step 310, the remote server 110 locates a proxy table corresponding to the fully-qualified name received at step 308, in accordance with an embodiment of the present invention. In accordance with an additional embodiment of the present invention, if a corresponding proxy table does not exist, one is created. A proxy table, in accordance with an embodiment of the present invention, is a local table (in this case, local to the remote server 110) that maps to a remote object (in this case, a table in local server 106).

At step 312, the remote server 110 pulls qualifying rows from local server 106 to remote server 110 using the proxy table construct. Qualifying rows are those rows that are needed in the join operation based on simplification of the query issued to the remote server 110, in accordance with an embodiment of the present invention. For example, if the conditions "LTABLE.A=RTABLE.A" and "RTABLE.A=110" must both be met, then any values of LTABLE.A needed for the join operation must also likewise have a value of 110. One skilled in the relevant art will appreciate that other means of determining what qualifying rows are needed from the local server 106 may be employed, and the aforementioned simplification of the query is shown by way of example, and not limitation.

The qualifying rows from local server 106 are pulled to remote server 110 by issuing a query to the local server 106 requesting the qualifying rows. At step 314, the join operation is performed at the remote server 110 using the qualifying rows and the table or tables located at the remote server 110. By pulling only the qualifying rows, rather than the entire table from local server 106, the bandwidth needed to perform the join operation by transferring data between the local server 106 and remote server 110 is reduced. Using the above example queries, an example query for the qualifying rows from local server 106 issued by remote server 110 would be in the following format:

---
select LTABLE.A, LTABLE.B from LTABLE where LTABLE.A = 110 and LTABLE.B = "BLUE";
---

This query would return, to the remote server, the following row from LTABLE:

---
| 110 | | BLUE |
---

At step 316, the result of the join operation is then sent to the local server, in accordance with an embodiment of the present invention. One skilled in the relevant art will appreciate that the above process can be performed using multiple proxy tables referencing multiple "remote" (i.e., remote to the system on which the query is processed) servers. The use of a single local table, LTABLE, and a single remote table, RTABLE, is also by way of example, and not limitation. One skilled in the relevant art will further appreciate that the aforementioned join operation may be extended to include multiple local tables and/or multiple remote tables in a single statement. Moreover, one skilled in the relevant art will appreciate that the aforementioned search conditions are shown by way of example, not limitation, and statements of arbitrary complexity may be used.

In accordance with an additional embodiment of the present invention the local table is the union of two or more other local tables. In accordance with a further embodiment of the present invention, the remote table is the union of two or more other remote tables. One skilled in the relevant art will appreciate that the above process can be extended to any data set that is accessed like a table.

Figure 4:
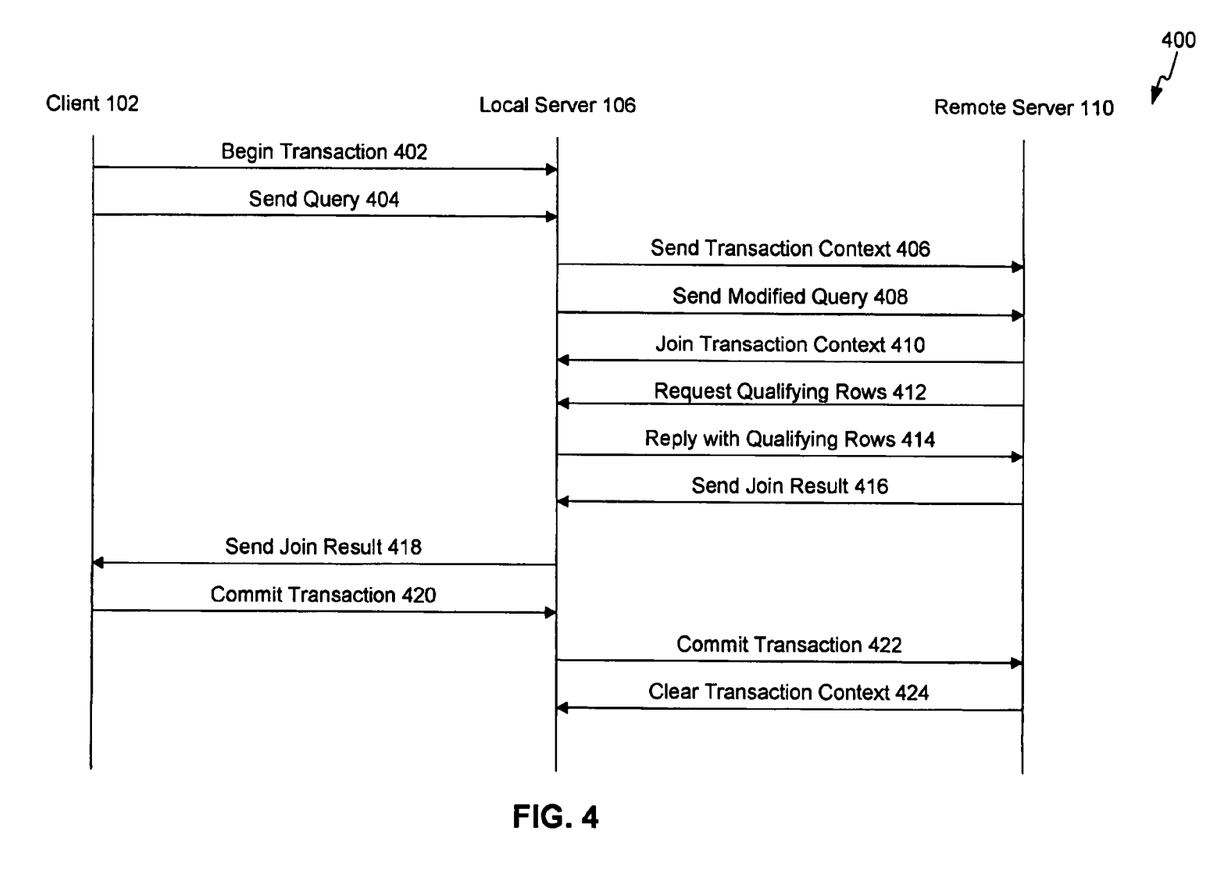
FIG. 4 is a communication diagram illustrating the flow of data between components of an example network, in accordance with an embodiment of the present invention.

FIG. 4 is a communication diagram 400 illustrating the operation and flow of communications between client 102, local server 106, and remote server 110, in accordance with an embodiment of the present invention. At step 402, client 102 issues a request to begin a database transaction, in accordance with an embodiment of the present invention. In accordance with an embodiment of the present invention, the database implemented by local server 106 and remote server 110 utilizes transactions to group instructions that must be executed as a unit, either implicitly or explicitly through the use of a command issued by the user. One skilled in the relevant art will recognize that the present invention can also be implemented in a database system that does not use transactions, or in a database system that does use transactions where the query command issued to the remote server is the only command that is part of the transaction.

At step 404, client 102 sends a query to local server 106. In accordance with an embodiment of the present invention, this query involves a join operation between a table located at local server 106 and a table located at remote server 110. The following steps assume that the optimizer, as further described in Section III, has determined that the use of a relocated join is beneficial, as in step 304 of FIG. 3.

At step 406, local server 106 sends a transaction context to remote server 110, in accordance with an embodiment of the present invention. Step 406 is performed in the case where the database in local server 106 and remote server 110 implements transactions. By sending the transaction context to remote server 110, remote server 110 is able to subordinate its own operations to a pending transaction in local server 106, which ensures the consistency of all operations within the transaction at local server 106.

At step 408, a modified query is sent from the local server 106 to remote server 110. This modified query is a re-written query that is generated, based on the query sent from client 102 to local server 106 at step 404, by replacing references to local tables at local server 106 with a fully-qualified name that enables remote server 110 to determine the location of the tables at local server 106. At step 410, the remote server 110 joins the transaction context of local server 106 which the remote server 110 received at step 406.

At step 412, remote server 110 requests qualifying rows from the local server 106, as in step 312 of FIG. 3. In accordance with an embodiment of the present invention, this request is accomplished by querying a proxy table at the remote server 110. At step 414, local server 106 replies with the qualifying rows. The remote server 110 then computes the result of the join operation between tables located at the remote server 110 and the qualifying rows retrieved from local server 106. At step 416, this result is sent to local server 106.

At step 418, the result of the join operation is passed on to client 102. At step 420, perhaps after additional operations have been processed, the client 102 issues an instruction to commit the transaction 420. In accordance with an embodiment of the present invention, local server 106 issues its own instruction at step 422 for the remote server 110 to commit the transaction. At this point, the remote server 110 has an up-to-date instance of the tables local to itself, and at step 424 replies to the local server 106 in order to clear the current transaction context. Local server 106 then commits its own pending changes to tables local to itself. One skilled in the relevant art will appreciate that other orders of operation for the aforementioned steps can be used to achieve the same result.

III. Optimization

Figure 5:
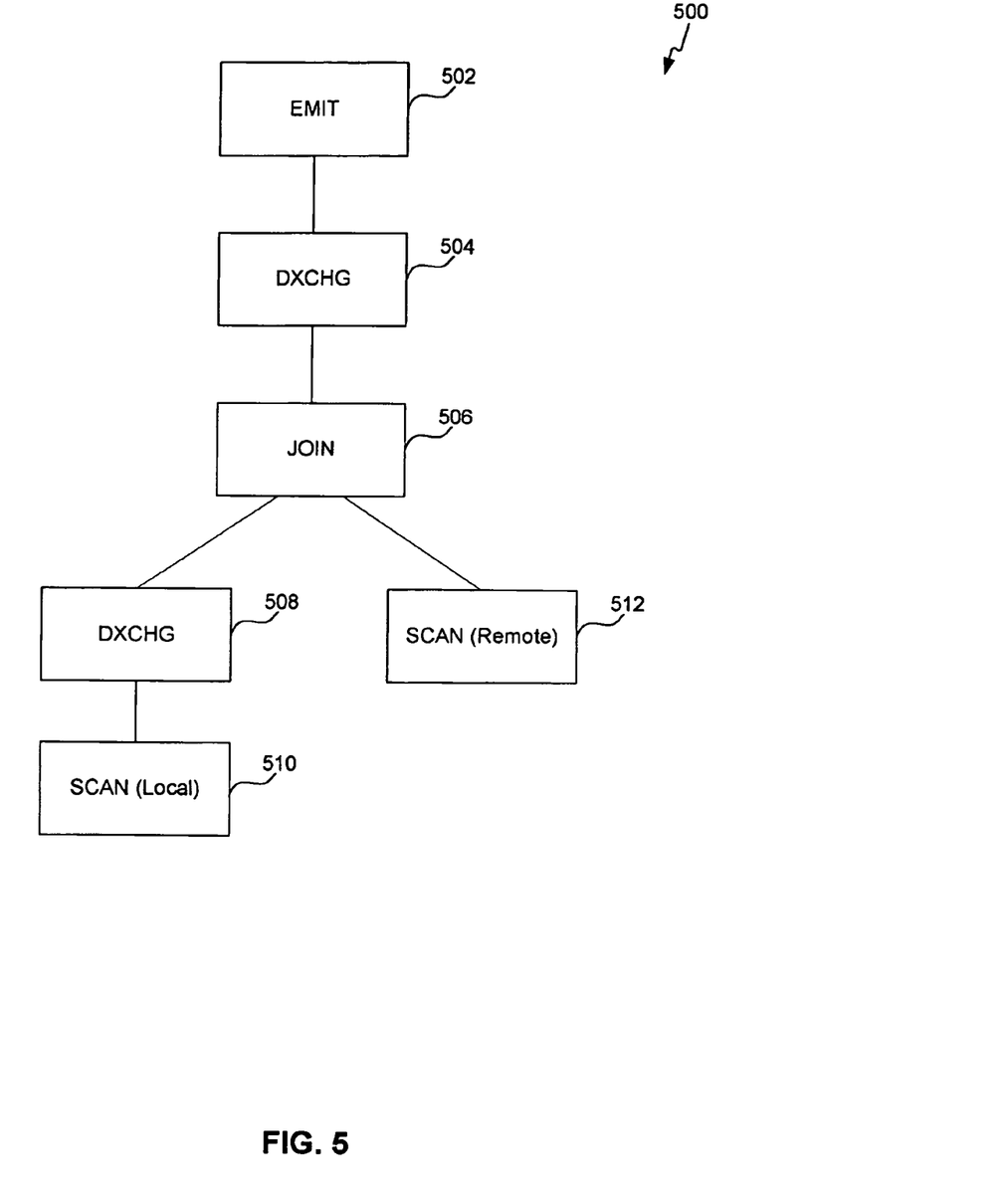
FIG. 5 is an optimization block diagram, in accordance with an embodiment of the present invention.

FIG. 5 is a chart (costing plan) 500 illustrating the various steps in a relocated join operation as considered by an optimizer module, in accordance with an embodiment of the present invention. Referring back to step 304 of FIG. 3, an optimizer is optionally employed in order to determine whether the relocated join operation is favorable to prior art methods for performing remote joins, and only performs a relocated join operation if it is determined to be beneficial, in accordance with an embodiment of the present invention.

The particular configuration of chart 500 illustrates that a join 506 is performed on the result of a scan of the remote tables 512 and the scan of the local tables 510. However, in order to perform the join operation, a distributed exchange 508 of the local tables is necessary. Distributed exchange 508 corresponds to the cost of retrieving the qualifying rows from the local database 106 to the remote database 110 over network 108, as shown in FIG. 1. Accordingly, the cost of the join operation is the sum of the costs of scanning the remote table 512, scanning the local table 510, transferring the qualified rows from the local server 106 to the remote server 110 in block 508, and the join operation itself 506. Furthermore, block 504 corresponds to the cost of sending the result rows from remote server 110 back to local service 106, and block 502 corresponds to the cost of sending the result rows from local server 106 to client 102.

Commonly, a relocated join operation will be found to be beneficial where the remote tables are large and the local tables are small, such that the distributed exchange 508 is a relatively inexpensive operation. If, instead, a large remote table was retrieved to a local server 106, the distributed exchange cost for this operation would be large, so performing the relocated join is favored. However, in accordance with an embodiment of the present invention, the costing plan of chart 500 considers the number of rows and the size of rows that flow through each element in chart 500. Moreover, in accordance with an additional embodiment of the present invention, the costing plan takes into account the number of times each element in chart 500 is invoked.

A chart similar to chart 500 may be constructed for other remote join methodologies in order to take into account the costs of that join. The optimizer is able to use the sum of the costs of the blocks comprising the chart to determine which remote join method should be employed. This is, generally speaking, the method with the lowest "cost," as measured in terms of bandwidth consumption, CPU clock cycles, data transfer speed, latency, and other performance metrics, in accordance with an embodiment of the present invention. Moreover, one skilled in the relevant art will appreciate that the chart 500 is a high-level chart of the relocated join operation, and that each of the blocks within chart 500 may themselves be further optimized. For example, the method used for distributed exchange 504 can be selected from a plurality of available distributed exchange methods, in accordance with an embodiment of the present invention.

IV. Example Computer System Implementation

Figure 6:
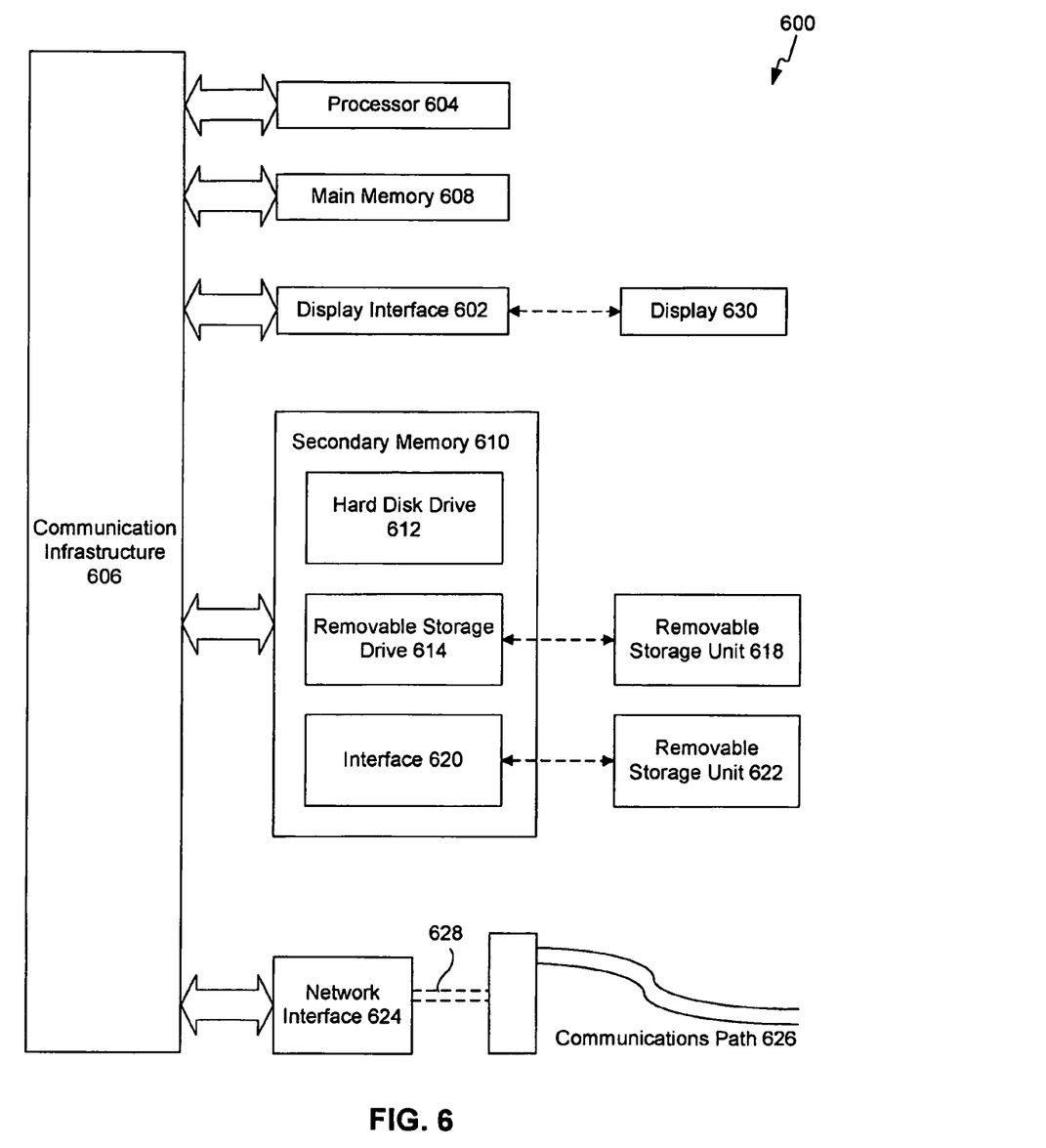
FIG. 6 depicts an example computer system in which embodiments of the present invention may be implemented.

Various aspects of the present invention can be implemented by software, firmware, hardware, or a combination thereof. FIG. 6 illustrates an example computer system 600 in which the present invention, or portions thereof, can be implemented as computer-readable code. For example, the methods illustrated by flowchart 300 of FIG. 3 and communication diagram 400 of FIG. 4, can be implemented in system 600. Various embodiments of the invention are described in terms of this example computer system 600. After reading this description, it will become apparent to a person skilled in the relevant art how to implement the invention using other computer systems and/or computer architectures.

Computer system 600 includes one or more processors, such as processor 604. Processor 604 can be a special purpose or a general purpose processor. Processor 604 is connected to a communication infrastructure 606 (for example, a bus or network).

Computer system 600 also includes a main memory 608, preferably random access memory (RAM), and may also include a secondary memory 610. Secondary memory 610 may include, for example, a hard disk drive 612, a removable storage drive 614, and/or a memory stick. Removable storage drive 614 may comprise a floppy disk drive, a magnetic tape drive, an optical disk drive, a flash memory, or the like. The removable storage drive 614 reads from and/or writes to a removable storage unit 618 in a well known manner. Removable storage unit 618 may comprise a floppy disk, magnetic tape, optical disk, etc. which is read by and written to by removable storage drive 614. As will be appreciated by persons skilled in the relevant art(s), removable storage unit 618 includes a computer usable storage medium having stored therein computer software and/or data.

In alternative implementations, secondary memory 610 may include other similar means for allowing computer programs or other instructions to be loaded into computer system 600. Such means may include, for example, a removable storage unit 622 and an interface 620. Examples of such means may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 600.

Computer system 600 may also include a communications interface 624. Communications interface 624 allows software and data to be transferred between computer system 600 and external devices. Communications interface 624 may include a modem, a network interface (such as an Ethernet card), a communications port, a PCMCIA slot and card, or the like. Software and data transferred via communications interface 624 are in the form of signals which may be electronic, electromagnetic, optical, or other signals capable of being received by communications interface 624. These signals are provided to communications interface 624 via a communications path 626. Communications path 626 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 618, removable storage unit 622, and a hard disk installed in hard disk drive 612. Signals carried over communications path 626 can also embody the logic described herein. Computer program medium and computer usable medium can also refer to memories, such as main memory 608 and secondary memory 610, which can be memory semiconductors (e.g. DRAMs, etc.). These computer program products are means for providing software to computer system 600.

Computer programs (also called computer control logic) are stored in main memory 608 and/or secondary memory 610. Computer programs may also be received via communications interface 624. Such computer programs, when executed, enable computer system 600 to implement the present invention as discussed herein. In particular, the computer programs, when executed, enable processor 604 to implement the processes of the present invention, such as the steps in the methods illustrated by flowchart 300 of FIG. 3 and communication diagram 400 of FIG. 4, discussed above. Accordingly, such computer programs represent controllers of the computer system 600. Where the invention is implemented using software, the software may be stored in a computer program product and loaded into computer system 600 using removable storage drive 614, interface 620, hard drive 612 or communications interface 624.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

XII. CONCLUSION

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method, comprising:
   receiving, at a remote server, a query from a local server wherein the query comprises a join operation that joins a local table at the local server and a remote table at the remote server;
   retrieving, from the local server, qualifying rows of the local table;
   joining the remote table with the qualifying rows to generate a result table; and
   sending the result table to the local server,
   wherein the remote server is configured to perform the receiving, retrieving, joining, and sending based on a cost associated with relocating the join operation to be processed at the remote server instead of the local server.

2. The method of claim 1, wherein the cost of the relocated join operation is assessed based on a result of scanning the local table and the remote table.

3. The method of claim 2, wherein the cost is further assessed based on a number and a size of the qualifying rows to be retrieved.

4. The method of claim 2, wherein the cost is further assessed based on a joining cost associated with generating the result table at the remote server instead of the local server.

5. The method of claim 1, further comprising:
   receiving the query at the local server;
   modifying the query to state a fully-qualified name for the local table; and sending the query to the remote server.

6. The method of claim 1, further comprising:
   receiving, at the remote server, a transaction context representing a transaction of the local server; and
   establishing a connection from the remote server to the local server, wherein the connection is joined to the transaction context.

7. The method of claim 1, wherein retrieving qualifying rows of the local table comprises:
   scanning a corresponding proxy table at the remote server.

8. A system, comprising:
   a receiving module configured to receive, at a remote server, a query from a local server, wherein the query comprises a join operation that joins a local table at the local server and a remote table at the remote server;
   a retrieving, from the local server, module configured to retrieve qualifying rows of the local table;
   a joining module configured to join the remote table with the qualifying rows to generate a result table; and
   a sending module configured to send the result table to the local server,
   wherein the receiving module, the retrieving module, the joining module, and the sending module are configured to perform their respective operations at the remote server based on cost associated with relocating the join operation to be processed at theremote server instead of the local server.

9. The system of claim 8, wherein the cost of the relocated join operation is assessed based on a result of scanning the local table and the remote table.

10. The system of claim 9, wherein the cost is further assessed based on a joining cost associated with generating the result table at the remote server instead of the local server.

11. The system of claim 8, further comprising:
    a second receiving module configured to receive the query at the local server;
    a modifying module configured to modify the query to state a fully-qualified name for the local table; and
    a second sending module configured to send the query to the remote server.

12. The system of claim 8, further comprising:
    a second receiving module configured to receive, at the remote server, a transaction context representing a transaction of the local server, and
    an establishing module configured to establish a connection trom the remote server to the local server, wherein the connection is joined to the transaction context.

13. The system of claim 8, wherein the retrieving module comprises:
    a scanning module configured to scan a corresponding proxy table at the remote server.

14. A computer-usable storage device having instructions recorded thereon that, if executed by a computing device, causes the computing device to perform operations comprising:
    receiving, at a remote server, a query from a local server, wherein the query comprises a join operation that joins a local table at the local server and a remote table at the remote server;
    retrieving, from the local server, qualifying rows of the local table;

joining the remote table with the qualifying rows to generate a result table; and sending the result table to the local server, wherein the remote server is configured to perform the receiving, retrieving joining, and sending based on a cost associated with relocating the join operation to be processed at the remote server instead of the local server, wherein the cost is assessed based on a result of scanning the local table and the remote table according to the query.

15. The computer-usable storage device of claim 14, the operations further comprising:

determining whether the join operation is optimal.

16. The computer-usable storage device of claim 15, wherein the cost is further assessed based on a joining cost associated with generating the result table at the remote server instead of the local server.

17. The computer-usable storage device of claim 14, the operations further comprising:

receiving the query at the local server;

modifying the query to state a fully-qualified name for the local table; and sending the query to the remote server.

18. The computer-usable storage device of claim 14, the operations further comprising:

receiving at the remote server, a transaction context representing a transaction of the local server; and establishing a connection from the remote server to the local server, wherein the connection is joined to the transaction context.

19. The computer-usable storage device of claim 14, wherein retrieving qualifying rows of the local table comprises:

scanning a corresponding proxy table at the remote server.

* * * * *